United States Patent [19]
Nickerson et al.

[11] 3,937,814
[45] Feb. 10, 1976

[54] COMPOSITIONS FOR SAFE EXTENSION OF STORAGE LIFE OF FOODS

[75] Inventors: John T. R. Nickerson, Buzzards Bay; John R. Darack, Holliston, both of Mass.

[73] Assignee: Dirigo Corporation, Boston, Mass.

[22] Filed: Mar. 29, 1974

[21] Appl. No.: 455,987

Related U.S. Application Data

[63] Continuation-in-part of Ser. No. 180,099, Sept. 13, 1971, abandoned.

[52] U.S. Cl. .................. 424/93; 424/10; 426/61; 426/335
[51] Int. Cl.² .. A61K 37/00; A23B 4/00; A23B 7/00
[58] Field of Search ............ 426/7, 9, 61, 227, 321, 426/335, 331, 334, 532, 43, 52, 56, 332, 151, 59; 424/93, 10

[56] References Cited
UNITED STATES PATENTS
3,022,176   2/1962   Lawrence et al. ............ 426/151 X

FOREIGN PATENTS OR APPLICATIONS
1,130,634   10/1968   United Kingdom

OTHER PUBLICATIONS
Preonas, D. L. et al., "Growth of Staphyloccus Aureus MF31 on the Top and Cut Surfaces of Southern Custard Pies," *Applied Microbiology*, July 1969, pp. 68–75.

*Primary Examiner*—Raymond N. Jones
*Assistant Examiner*—R. A. Yoncoskie
*Attorney, Agent, or Firm*—Joseph Zallen

[57] ABSTRACT

A spoilage control composition containing an inoculum of *Pediococcus cerevisiae* or *Lactobacillus viridescens* and a combination of a sorbic acid compound and a propionic acid compound which permits the benign organism to grow but suppresses the common foodborne disease organisms and spoilage organisms.

6 Claims, No Drawings

COMPOSITIONS FOR SAFE EXTENSION OF STORAGE LIFE OF FOODS

This application is a continuation-in-part of our copending application Ser. No. 180,099, Filed Sept. 13, 1971 and now abandoned.

BACKGROUND OF INVENTION

This invention relates to a method of safely extending the storage life of foods, particularly those susceptible to contamination and spoilage, as for example, chicken salad, custard-filled foods and fish fillets. In particular this invention relates to a method for treating such foods so as to not only extend the storage life but also inhibit the growth of common food-borne disease organisms, as for example, Staphylococcus and Salmonella species.

It should be noted that while this invention relates principally to easily spoiled foods as above, it is not intended for use with cultured food products such as creamed cottage cheese, cultured buttermilk, yogurt and the like. Such cultured food products are intended and do contain a substantial microbiological population when sold and present entirely different problems with respect to contamination and spoilage.

The food products with which the present invention is primarily concerned are very susceptible to both the growth of spoilage organisms and the growth of food-borne disease organisms. Thus, it has heretofore been exceedingly difficult to handle in satisfactory commercial manner such products as custard pies, eclairs, battered fish fillets, potato salad, egg salad, cooked lobster meat, cooled peeled shrimp, chicken salad, crab meat salad, and tuna salad because of rapid spoilage even when under refrigeration. Part of the problems with regard to such foods has been the difficulty in proper initial handling of the foods and the growth of food-borne disease organisms and spoilage organisms through many sequences in the cycle of preparation and storage. Further, it is difficult with respect to such foods to provide any microbial reducing treatment, as for example, sterilization or pasturization without seriously impairing the flavor or texture of the food.

Proposals have been made in the past for treating food with non-toxic acidic chemicals which metabolize readily. Thus, in U.S. Pat. No. 2,711,976, amino acids such as glycine or serine are suggested to increase the resistance of custard foods to spoilage organisms and Staphylococcus. U.S. Pat. No. 2,898,372, suggests calcium acetate propionate to reduce the mold in bread. U.S. Pat. No. 2,866,819 refers to the use of sorbic acid as a fungistat and preservative in foods generally. U.S. Pat. NO. 2,910,368 discloses the use of EDTA with sorbic acid to increase the shelf life of vegetable salads containing an acidic edible dressing. U.S. Pat. No. 2,992,114 suggests sorbic acid and mild heat treatment for the preservation of fruit and vegetables. U.S. Pat. No. 3,021,219 proposes sorbic acid to prevent mold in bread.

In a paper published in *Applied Microbiology*, Volume 18, pages 68-75 (July, 1969), Preonas et al reported on the use of a mixture of sorbic acid and propionic acid to retard the growth of *Staphylococcus aureus* on the top and cut surfaces of Southern Custard Pies. Although some retardation was found, it was noted that inhibition was affected by the moisture gradient so that the package would require refrigeration after opening. Further, there was evidence of mold formation after nine days. However, such prior art chemicals, used as described, could extend the storage life of the foods so as to permit growth of Clostridium.

One object of the present invention is to provide a novel method of safely extending the storage life of foods.

A further object of this invention is to provide such a method which is particularly adapted to foods highly susceptible to contamination and spoilage.

Another object of this invention is to provide such a method which concurrently inhibits the growth of common food-borne disease organisms.

A further object of this invention is to provide a preservative material for safely extending the storage life of foods.

Another object of this invention is to provide such a preservative material which also inhibits the growth of common disease-born organisms.

Other objects and advantages of this invention will be apparent from the description and claims which follow.

SUMMARY OF INVENTION

The present invention is concerned with extending the useful storage life of food products which are highly susceptible to contamination and spoilage as, for example, custard-type foods, salads and fish fillets. The present invention comprises broadly suppressing common food pathogens and common spoilage organisms in such food products and then rendering such food products unpalatable after a finite period of time.

The means for accomplishing this invention comprise the combination of an inoculum of a benign organism which is a non-pathogenic member of the Lactobacteriaciae and a bacteriostatic organic acid composition. The bacteriostatic organic acid composition permits the benign organism to grow but suppresses the common food-borne disease organisms and spoilage organisms. After a finite period of time, the benign organism inoculum has grown to a point where it now causes a undesirable flavor in the food, so that the food must now be discarded.

Among the bacteria which can be used for the inoculum are those such as *Pediococcus cerevisiae*, which normally grow in food in a temperature range of 40° to 86° F. Other suitable organisms include *Lactobacillus viridescens*. It should be noted that there are certain species in the Lactobacteriaceae family which normally do not grow below about 50° F and hence would not be suitable in this invention for products which would normally be stored under refrigeration. Cultures for the above-identified organisms are available from collections maintained for such purposes, as for example, American Type Culture Collection of Rockville, Maryland.

The bacteriostatic organic acid is preferably selected from those which are active with only minimal effect on flavor and which inhibit spoilage and food-borne disease organisms at 40° to 86° F but do not inhibit the inoculum. We have found that a mixture of sorbic acid with potassium, calcium or sodium propionate provides such selective inhibition with minimum effect on flavor, thus inhibiting salmonallae, *Staphylococcus aureus* and spoilage organisms, but permitting the growth of the inoculum. Sorbic acid alone won't inhibit pathogens.

Among the products which are particularly benefited by the method and products of this invention are custardtype food such as custard pies, eclairs, Boston cream pies, squash pies, salads, such as chicken salad, egg salad, potato salad, tuna salad, crab meat salad, ham salad, lobster salad, shrimp salad and fish fillets. In the past, many of these food products have been implicated in the transmission of food-borne diseases of salmonellae of *Staphylococcus aureus* origin.

The chemical mixture and inoculum can be added separately to the food product or may be added together. In addition to an inoculum consisting of a single organism, the inoculum can be a combination of two or more non-pathogenic members of the Lactobacteriaceae characterized as growing in food in the temperature range of approximately 40° to 86° F.

The percentages of sorbic acid compound and propionate compound that are useful in this invention are generally quite small. Larger amounts can be used but do add little to their effectiveness in this invention. Thus, sorbic acid is effective in a concentration as low as about 0.10%. It is preferred that the sorbic acid be used in a concentration of about 0.15%, which approximates its solubility in water. If a salt of sorbic acid is used, as for example, sodium or potassium sorbate, slightly higher concentrations should be used.

With respect to propionic acid, a propionate salt is preferred over the acid because of better odor and flavor. Sodium propionate and calcium propionate are effective in concentrations as low as about 0.10%. It is preferred that the propionate be used in a concentration of about 0.45% so that the preferred combination is 0.15% sorbic acid and 0.45% sodium propionate.

The amount of inoculum used in this invention will vary according to the length of the desired period of time before the organism causes the off flavor or unpalatability by its growth. Generally, the percentage by weight of the dried culture per pound of food material should be no less than about 0.002%. At lower percentages, the period of time before the food becomes unpalatable may be unduly long. The percentage of dried culture in the specific examples 1 – 10 represents 0.02% of dried culutre per pound of food product.

In addition to extending the normal storage life of such food products the present invention also provides a warning to discard the food if the food has been improperly handled. Thus, the invention will render the food products unpalatable when they have been improperly stored, held at a temperature higher than normal refrigeration or stored for too long a period of time. In other words, the food products will become unpalatable when or if they have been held for a significant time at higher than normal temperatures or for too long a period of time even at normal temperatures.

The present invention differs from all other previously described products intended to extend the storage life or preserve a food product. The product of this invention creates self-limiting preservation and controlled spoilage so that the product will become unpalatable automatically as soon as it is beyond the conditions of safe storage.

SPECIFIC EXAMPLES OF INVENTION

In the following Examples 1 – 7 the term "chemical mixture" is used to define a mixture of one part sorbic acid and three parts sodium propionate: the term "inoculum" is used to mean "*Pediococcus cerevisiae*" ATTC8042 in the proportion of 0.1 gram of the dried culture per pound of chemical mixture. Unless otherwise specified, the chemical mixture was added in such proportions to provide a concentration of approximately 0.15% sorbic acid and 0.45% sodium propionate in the particular food product.

EXAMPLE 1

Custard filling from fresh, commercially purchased vanilla eclairs was mixed with *Staphlyococcus aureus* (Type B-2) and separated into separate portions. One portion received no further treatment. Another portion was treated with the chemical mixture. Each portion was examined for its count of enterotoxic staphylococci. The portions were then both incubated for two days at 86°F. After this incubation, organoleptic observations and counts for enterotoxic staphylococci were made on all samples.

The portion that was not treated increased its staphylococci count one thousandfold and had a medicinal odor. The treated portion had about the same staphylococci count as it did initially and the normal vanilla odor and flavor.

EXAMPLE 1 A

Example 1 was repeated, this time incubating at 40°F. The untreated portion spoiled in 7 days while that treated with the chemical mixture was still satisfactory after 7 days.

EXAMPLE 1 B

Example 1 was repeated, this time incorporating the inoculum. The product spoiled in 14 days due to the growth of both spoilage-type bacteria and the *Pediococcus cerevisae*.

EXAMPLE 2

Freshly prepared chicken salad was inoculated with *Salmonella typhimurium*. One portion was left untreated and the other treated with the chemical mixture. Counts were made for Salmonella on both portions and then the samples were incubated for two days at 86°F.

The untreated portion was putrid and had a Salmonella count ten times as highly as initially. The treated portion had a normal odor and a slight decrease in Salmonella count.

EXAMPLE 3

In a variation of Example 2, the treated and untreated portions were incubated for ten days at about 40°F, with spoilage type bacteria counts made before and after. The untreated samples increased their count of spoilage bacteria one thousandfold while the treated sample did not increase and in some instances slightly decreased its count.

EXAMPLE 4

In another variation of Example 2, inoculum of *Pediococcus cerevisiae* was added to the portion treated with the chemical mixture. The samples were incubated for four days at 75°F. The untreated samples were putrid while the treated samples were only very slightly putrid with a substantial increase in *Pediococcus cerevisiae*.

EXAMPLE 5

Breaded fish fillets were divided into two portions. One portion was untreated while the surface of the other portion was treated with chemical mixture and inoculum. The storage life of the treated fillets at 40°F was approximately ten days beyond that of the untreated portion. At the time of spoilage of the treated sample, one-third of the bacteria present were of the ordinary spoilage type while two-thirds were *Pediococcus cerevisiae*.

EXAMPLE 6

A combination of the chemical mixture and the inoculum was packaged together in moisture-proof containers. Some containers were incubated at about 72°F for four weeks while others were incubated at 40°F for about four weeks. In both cases there was significant survival of *Pediococcus cerevisiae*. In the case of the 40°F sample, there was substantially no decrease in the count of *Pediococcus cerevisiae*.

EXAMPPLE 7

Following the techniques of Example 1 addition of the inoculum and chemical mixture to chicken salad containing *Salmonella typhimurium* was found to extend the safe storage life to 14 days at 40°F, the growth being principally spoilage-type bacteria and *Pediococcus cerevisiae*.

EXAMPLE 8

The filling from a number of eclairs was placed in an electric blender, inoculated with a culture of *Lactobacillus viridescens* (ATCC 12706), and mixed. Plate cultures were prepared with APT agar and incubated anaerobically at 75°F (23.9 C) for 5 days to determine the count of lactobacilli.

Portion A was removed to a sterile breaker and held for 24 hours at 86°F (30 C) and Portion B removed to a sterile petri dish, and held for 14 days at 40°F (4.4 C) after which counts were made for lactobacilli as indicated above.

The weight of the remaining eclair material in the blender was then determined and 0.15% of sorbic acid and 0.45% of sodium propionate were added and mixed.

Portion C was removed to a sterile beaker and held for 24 hours at 86°F and Portion D removed to a sterile petri dish and held for 14 days at 40°F, after which counts for lactobacilli were made, as indicated above.

The filling from a number of eclairs was placed in a blender, inoculated with a culture of *Pediococcus cereivisiae* (ATCC 8042), and mixed. Plate cultures were prepared with APT agar and incubated anaerobically at 75°F for 5 days to determine the count of pediococci.

Portion E was removed to a sterile beaker, and held at 86°F for 24 hours, and Portion F removed to a sterile petri dish and held at 40°F for 14 days after which counts for pediococci was made as indicated above.

The weight of the remaining eclair material was determined and 0.15% of sorbic acid and 0.45% of sodium propionate were added and mixed.

Portion G was removed to a sterile beaker and held for 24 hours at 86°F and Portion H removed to a sterile petri dish and held at 40°F for 14 days, after which counts were made for pediococci as indicated above.

EXAMPLE 9

A quantity of chicken salad was placed in a blender, inoculated with a culture of *Lactobacillus viridescens* (ATCC 12706), and mixed. Plate cultures were prepared with APT agar and incubated anaerobically at 75°F for 5 days to determine the count of lactobacilli.

Portion I was removed to a sterile beaker and held at 86°F for 24 hours and Portion J removed to a sterile petri dish and held at 40°F for 14 days, after which counts were made as indicated above to determine the number of lactobacilli.

The weight of the remaining chicken salad was determined and 0.15% of sorbic acid and 0.45% of sodium propionate were added and mixed.

Portion K was removed to a sterile beaker and held for 24 hours at 86°F, and Portion L removed to a sterile petri dish and held at 40°F for 14 days, after which counts were made, as indicated above, to determine the number of lactobacilli.

EXAMPLE 10

A portion of chicken salad was added to a blender. A culture of *Pediococcus cerivisiae* (ATCC 8042) was added and mixed. Plate cultures were prepared with APT agar and incubated anaerobically for 5 days at 75°F to determine the count of pediococci.

Portion M was removed to a sterile beaker and held for 24 hours at 86°F and Portion N removed to a sterile petri dish for 14 days at 40°F, after which counts were made as indicated above to determine the number of pediococci. The weight of the remaining chicken salad was determined and 0.15% of sorbic acid and 0.45% of sodium propionate were added and mixed.

Portion O was removed to a sterile beaker and incubated at 86°F for 24 hours and Portion P removed to a sterile petri dish and placed at 40°F for 14 days, after which counts were made to determine the number of pediococci, as indicated above.

The results of Examples 8, 9 and 10 are shown in Table 1. The data shows that both *Lactobacillus viridescens* and *Pediococcus cerevisiae* grow in custard filling or chicken salad in the temperature range of about 40° to 86°F. Both grow well even in the presence of the chemical mixture at 86°F but somewhat slower at 40°F. Nevertheless, the growth at 40°F is sufficient to cause spoilage after a reasonable extension of storage life.

Table 1

| Sample code | Material and Treatment | Time and Temp. of incubation | Count per gram (Ave. of 2 plates) |
|---|---|---|---|
| none | custard with L. viridescens | none | 5,800,000 |
| none | custard with P. cerivisiae | none | 6,400,000 |
| none | chicken with L. viridescens | none | 16,000,000 |
| none | chicken with P. cerivisiae | none | 18,000,000 |
| A | custard with L. viridescens | 24 hours at 86 F | 620,000,000 |
| C | Custard with L. viridescens plus chemicals | 24 hours at 86 F | 600,000,000 |
| B | custard with L. viridescens | 14 days at 40 F | 700,000,000 |
| D | custard with L. viridescens plus chemicals | 14 days at 40 F | 130,000,000 |
| E | custard with P. cerivisae | 24 hours at 86 F | 780,000,000 |
| G | custard with P. cerivisae plus chemicals | 24 hours at 86 F | 620,000,000 |
| F | custard with P. cerivisiae | 14 days at 40 F | 780,000,000 |

Table 1-continued

| Sample code | Material and Treatment | Time and Temp. of incubation | Count per gram (Ave. of 2 plates) |
|---|---|---|---|
| H | custard with P. cerivisiae plus chemicals | 14 days at 40 F | 140,000,000 |
| I | chicken with L. viridescens | 24 hours at 86 F | 370,000,000 |
| K | chicken with L. viridescens plus chemicals | 24 hours at 86 F | 410,000,000 |
| J | chicken with L. viridescens | 14 days at 40 F | 1,100,000,000 |
| L | chicken with L. viridescens plus chemicals | 14 days at 40 F | 510,000,000 |
| M | chicken with P. cerivisiae | 24 hours at 86 F | 400,000,000 |
| O | chicken with P. cerivisiae plus chemicals | 24 hours at 86 F | 460,000,000 |
| N | chicken with P. cerivisiae | 14 days at 40 F | 1,100,000,000 |
| P | chicken with P. cerivisiae plus chemicals | 14 days at 40 F | 450,000,000 |

EXAMPLE 11.

A custard filling was prepared from milk, sugar, egg yolk and flour. This was heated, then diluted one to one with sterilized distilled water. A portion of this mixture was inoculated with a culture of *Salmonella typhimurium* and a count for the number of the above organisms present in the inoculated menstrum was made by plating serial dilutions on bismuth sulfite agar.

The inoculated material was divided into two portions to one of which (labelled C) one-tenth percent by weight of sorbic acid was added. To the other portion (labelled D) one-tenth percent sorbic acid and three-tenths percent sodium propionate were added. These portions were then incubated for seven days at 70° – 75° F after which counts for Salmonellae were made on each portion by plating serial dilutions on bismuth sulfite agar.

| Material | Results - Salmonellae per gram | | |
|---|---|---|---|
| | 1 | 2 | ave. |
| Starting material (0 days) | 1,000,000 | 960,000 | 960,000 |
| Sample C (0.1% sorbic acid) (7 days) | 7,200,000 | 6,000,000 | 6,600,000 |
| Sample D (0.1% sorbic acid plus 0.3% sodium propionate) (7 days) | 460,000 | 420,000 | 440,000 |

The experiments show that in diluted custard filling containing Salmonella and 0.1% of sorbic acid during 7 days incubation at 70° – 75° F, the number of Salmonella increased by approximately 10 times.

In diluted custard filling containing Salomonella, 0.1% of sorbic acid and 0.3% of sodium propionate during 7 days incubation at 70° – 75° F., the number of Salmonella decreased slightly.

It is concluded that sorbic acid along will not inhibit *Salmonella typhimurium*.

EXAMPLE 12

Chicken salad samples were prepared as follows:
1. Contol - nothing added
2. 0.15% sorbic acid and 0.45% sodium propionate added
3. 0.15% sorbic acid and 0.45% sodium propionate and 0.002% "Accel" (a dried culture of *Pediococcus cereisiae* on a carrier) added
4. 0.15% sorbic acid, 0.45% sodium propionate and 0.008% "Accel" added
5. 0.15% sorbic acid, 0.45% sodium propionate and 0.02% "Accel" added.

At the start an aerobic count was made on sample 1 using Eugon agar with 0.5% of peptone and incubating at 68° F for 5 days.

At the start anaerobic counts were made on samples 3, 4, and 5 (after mixing) on APT agar and incubating for 3 days at 85° F.

All prepared samples were incubated for 7 days at 50° F after which they were observed for odor and bacterial counts were made as follows:

Samples 1 and 2 - aerobic counts were made on Eugon agar with 0.5% of peptone, cultures incubated for 5 days at 68° F.

Samples 3, 4 and 5 - anaerobic counts were made on APT agar, cultures incubated for 3 days at 85° F.

RESULTS

| Sample | Time of count | odor | Type of Count | Actual Count | |
|---|---|---|---|---|---|
| 1 | start | OK | aerobic | 30,000 | |
| | | | | 32,000 | 31,000/g |
| 2 | " | " | not made | | |
| 3 | " | " | anaerobic | 65,000 | |
| | | | | 77,000 | 71,000/g |
| 4 | " | " | anaerobic | 168,000 | |
| | | | | 172,000 | 170,000/g |
| 5 | " | " | anaerobic | 750,000 | |
| | | | | 860,000 | 810,000/g |
| 1 | 7 days at 50 F | slightly putrid | aerobic | 39,000,000 | |
| | | | | 44,000,000 | 42,000,000/g |
| 2 | " | OK | aerobic | 5,000,000 | |
| | | | | 6,200,000 | 5,600,000/g |

RESULTS-continued

| Sample | Time of count | odor | Type of Count | Actual Count | |
|---|---|---|---|---|---|
| 3 | '' | slightly sour | anaerobic | 12,100,000 8,000,000 | 10,000,000/g |
| 4 | '' | '' | anaerobic | 17,200,000 15,600,000 | 16,000,000/g |
| 5 | '' | sour | anaerobic | 44,000,000 38,000,000 | 41,000,000/g |

It was concluded that the addition of *Pediococcus cerevisiae* cause chicken salad, stabilized with sorbic acid and solium propionate, to deteriorate or go bad when the sample is mishandled, as illustrated by samples 3, 4 and 5 being sour after holding for 7 days at 50° F.

Chicken salad stabilized with sorbic acid and sodium propionate without the addition of *Pediococcus cerevisiae* does not deteriorate as soon as the same type of sample containing such under conditions of mishandling, as illustrated by sample 2, which did not display any off odor after holding for 7 days at 50° F. It is thus clear that a benign organism, such as *Pediococcus cerevisiae* is necessary to signal that the food should be discarded.

We claim:

1. A spoilage control composition for use with food products highly susceptible to contamination and spoilage selected from the group of foods consisting of custard-type foods, salads and fish fillets, comprising: the combination of an inoculum of bacteria and an organic acid compound which inhibits the growth of common food-borne disease and spoilage organisms in the temperature range of approximately 40° to 86° F., but only slightly inhibits the growth of the inoculum at such temperatures; the inoculum being a non-pathogenic member of the Lactobacteriaciae which is characterized as growing in food in the temperature range of approximately 40° to 86° F.; said inoculum being either *Pediococcus cerevisiae* or *Lactobacillus viridescens;* said orgnaic acid compound being a mixture of sorbic acid compound with propionate compound; said sorbic acid compound being either sorbic acid, potassium sorbate or sodium sorbate and said propionate compound being either sodium propionate or potassium propionate or calcium propionate; each said compound being present at a concentration of at least 0.10%; said composition being characterized in that the growth of common disease and spoilage organisms in such food are inhibited, but said inoculum grows for a finite period of time until it causes an undesirable flavor in the foods, thus causing the food to be discarded.

2. The composition of claim 1 wherein the inoculum is *Pediococcus cerevisiae*.

3. The composition of claim 1 wherein the inoculum is *Lactobacillus viridescens*.

4. The composition of claim 1 wherein the sorbic acid compound has a concentration of at least 0.10%, the propionate compound at least 0.10% and the inoculum at least 0.002%.

5. The composition of claim 4 wherein the inoculum is *Pediococcus cervisiae*.

6. The composition of claim 4 wherein the inoculum is *Lactobacillus viridescens*.

* * * * *

UNITED STATES PATENT AND TRADEMARK OFFICE
CERTIFICATE OF CORRECTION

PATENT NO. : 3,937,814
DATED : February 10, 1976
INVENTOR(S) : John T. R. Nickerson and John R. Darack It is certified that error appears in the above-identified patent and that said Letters Patent are hereby corrected as shown below:

In Column 1, Line 33 change "cooled" to "cooked".
In Column 2, Line 39 change last "a" to "an".
In Column 2, Line 68 change "custardtype" to "custard-type".
In Column 7, Table 1 change "cerivisiae" to "cerevisiae".
In Column 7, Line 24 change "menstrum" to "menstruum".
In Column 7, Line 54 change "along" to "alone".
In Column 8, Line 20 change "Contol" to "Control".
In Column 8, Line 25 change "cereisiae" to "cerevisiae".
In Column 10, Line 14 change "orgnaic" to "organic".
In Column 10, Line 36 change "cervisiae" to "cerevisiae".

Signed and Sealed this

Thirteenth Day of July 1976

[SEAL]

Attest:

RUTH C. MASON
*Attesting Officer*

C. MARSHALL DANN
*Commissioner of Patents and Trademarks*